United States Patent
Wake et al.

(10) Patent No.: US 6,525,993 B2
(45) Date of Patent: Feb. 25, 2003

(54) SPEAKER DIRECTION DETECTION CIRCUIT AND SPEAKER DIRECTION DETECTION METHOD USED IN THIS CIRCUIT

(75) Inventors: Yasuhiro Wake, Tokyo (JP); Taisuke Sasada, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/783,334

(22) Filed: Feb. 15, 2001

(65) Prior Publication Data

US 2001/0019516 A1 Sep. 6, 2001

(30) Foreign Application Priority Data

Feb. 23, 2000  (JP) .................................... 2000-045306

(51) Int. Cl.$^7$ ................................................. G01S 3/80
(52) U.S. Cl. ......................................... 367/127; 367/125
(58) Field of Search ................................. 367/127, 125; 708/5; 381/92; 704/275

(56) References Cited

U.S. PATENT DOCUMENTS 5,565,764 A  * 10/1996  Prieb et al. ..................... 708/5
6,009,396 A  * 12/1999  Nagata ........................ 381/92

FOREIGN PATENT DOCUMENTS

JP          7-123311         5/1995

OTHER PUBLICATIONS

Oga et al., "Sound Systems and Digital Processing", 7.2 Techniques for estimating the direction of arrival and power of sound, issued by Institute of Electronics, Information and Communication Engineers Conference, Mar. 25, 1997, pp. 197 to 199.

* cited by examiner

Primary Examiner—Daniel T. Pihulic
(74) Attorney, Agent, or Firm—Sughrue Mion, PLLC

(57) ABSTRACT

Signals from microphones 1, 2 are first stored in memory circuits 4, 6 and then supplied to a cross-correlation arithmetic circuit 7, following which a cross-correlation operation is carried out and cross-correlation function values are calculated for each time difference. An evaluation function circuit 8 carries out addition processing of particular time intervals based on the cross-correlation function values and then searches for the maximum value to calculate time differences. Signals from the microphones 2, 3 are first stored in memory circuits 6, 5 and then supplied to a cross-correlation arithmetic circuit 9, following which a cross-correlation operation is carried out and cross-correlation function values are calculated for each time difference. An evaluation function circuit 10 carries out addition processing of particular time intervals based on the cross-correlation function values and then searches for the maximum value to calculate time differences. A position calculation circuit 11 finds a horizontal direction angle and a vertical direction angle based on these time differences (delay).

17 Claims, 10 Drawing Sheets

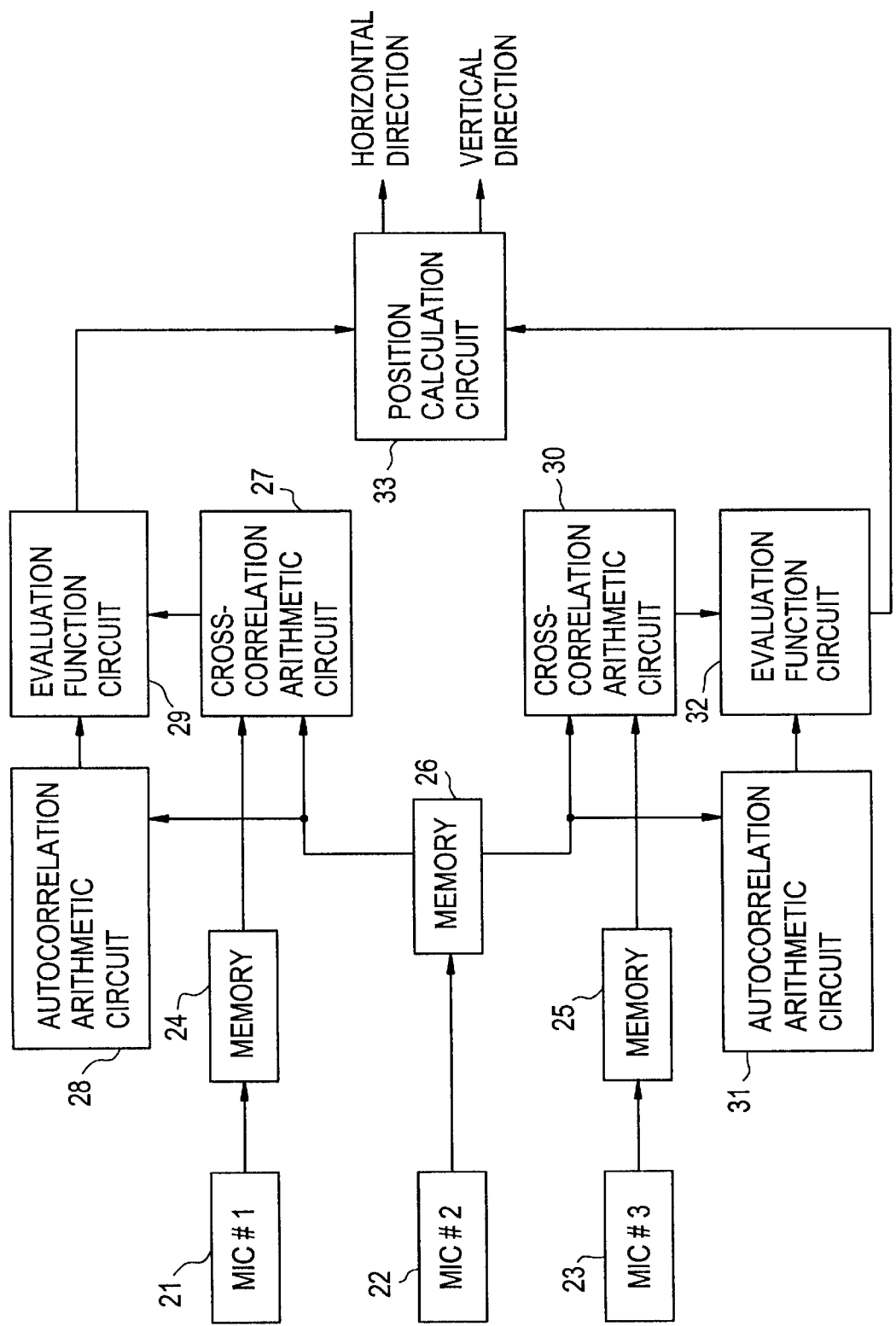

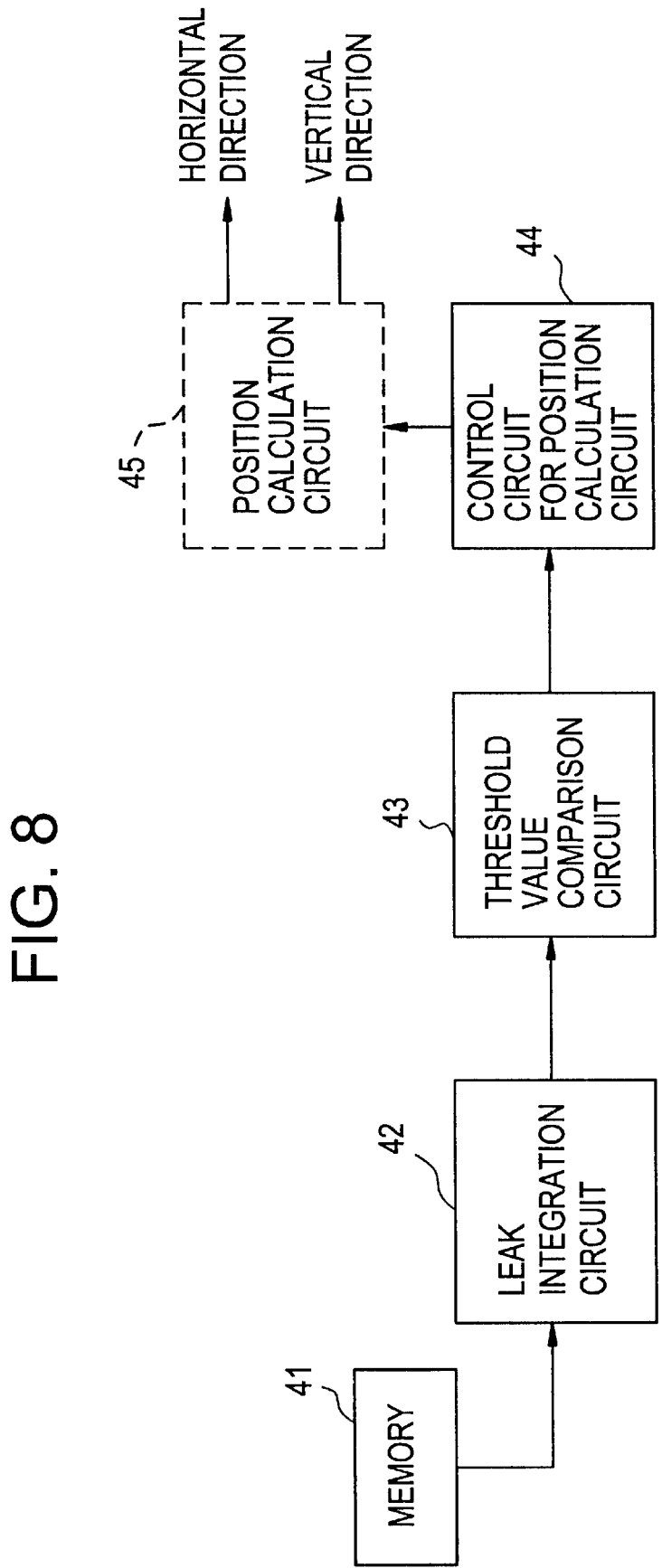

SPEAKER DIRECTION DETECTION CIRCUIT AND SPEAKER DIRECTION DETECTION METHOD USED IN THIS CIRCUIT

BACKGROUND OF THE INVENTION

1. Field of the Invention

The present invention relates to a speaker direction detection circuit and to a speaker direction detection method used in the circuit, and more particularly to the detection circuit and method of a device that detects the direction of a speaker as seen from the device by means of speech signals and that is used in controlling the video camera imaging angle of a device that incorporates an video camera for image input and a microphone for speech input used in a television conference device.

2. Description of the Related Art

As described in "7.2 Techniques for estimating the direction of arrival and power of sound" from "Sound Systems and Digital Processing" (Oga, Yamazaki, Kaneda, Institute of Electronics, Information and Communication Engineers Conference, Mar. 25, 1995, p. 197), the cross-correlation function is typically used as a means for detecting the difference in arrival times (delay) at the two microphones in devices for detecting the direction of a speaker.

This cross-correlation function is calculated, and as shown in FIG. 1 or FIG. 2, the difference in arrival times (delay) can be detected from the maximum value of the cross-correlation function. It is generally known that the direction of arrival of sound waves can be estimated from this time difference (delay). In other words, the direction of arrival of sound waves and the time difference between signals received at each of a plurality of microphones are in a one-to-one relation, and if these time differences can be estimated, the direction of arrival of the sound waves can also be estimated.

FIG. 1 and FIG. 2 are explanatory views of a typical detection method for detecting both the horizontal direction position and vertical direction position of arriving sound waves. Angle θ in the horizontal direction of sound waves that arrive at microphones M1 and M2 in FIG. 1 is detected by the equation:

$$L \sin \theta = \gamma Th$$

$$\theta = \sin^{-1}(\gamma Th/L)$$

In this case, the time difference (delay) Th can be found from: sampling period (seconds)×difference (number of samples). The vertical angles of sound waves that arrive at microphones M2 and M3 in FIG. 2 can also be estimated from similar equations.

As shown in FIG. 3, sound waves that arrive from direction $\theta_s$ are assumed to be plane waves, and it is assumed that these plane waves are received at two microphones M1 and M2 that are installed separated by a distance d from each other. At this time, the received signals $\chi 1(t)$ and $\chi 2(t)$ of each of microphones M1 and M2 are in the relation:

$$\chi 2(t) = \chi 1(t - \tau_s)$$

$$\tau_s = (d \times \sin(\theta_s))/c$$

where c is the speed of sound.

Conversely, if the time difference (s between signals ((t) and (2(t) is known, the arrival direction (s of the sound waves can be found from the following equation:

$$\theta_s = \sin^{-1}(c \cdot \tau_s/d)$$

Based on the cross-correlation function $\phi 12(\tau)$ of $\chi 1(t)$ and $\chi 2(t)$, time difference ($\tau_s$ is:

$$\phi 12(\tau) = E[\chi 1(t) \cdot \chi 2(t + \tau)]$$

$$= E[\chi 1(t) \cdot \chi 1(t + \tau - \tau_s)]$$

$$= \phi 11(\tau - \tau_s)$$

where $E[\cdot]$ represents the expected value, and $\phi 11(\tau)$ represents the autocorrelation of $\chi 1(t)$.

Since it is known that autocorrelation function $\phi 11(\tau)$ reaches a maximum at $\tau=0$, $\phi 12(\tau)$ attains a maximum at $\tau=\tau_s$. From this, $\tau_s$ is obtained if cross-correlation function $\phi 12(\tau)$ is calculated and $\tau$ that gives the maximum value is found, and the direction of the sound waves can be estimated if this value is substituted into the equation for finding the arrival direction $\theta_s$. Accordingly, the arrival delay time is found based on this estimation result, and the operation of converting to and outputting the speaker's direction is then carried out.

It is already known that cross-correlation function $\phi 12(\tau)$ will have a relatively sharp peak if the frequency bandwidth is broad. Thus, $\tau_s$ can be accurately estimated despite the addition of noise if the peak is sharp. However, because the sharpness of the peak is influenced by the frequency bandwidth of the sound wave signal and because there is also influence from noise, some method must be used to eliminate the influence of error.

In the method disclosed in Japanese Patent Laid-open No. 123311/1995, for the purpose of controlling the image pickup angle of the camera of an image pickup device, a unidirectional microphone and a bidirectional microphone are used as the audio signal input sources and as a means for receiving the voice signal of the subject and detecting direction; and a means is used for synchronizing the output signals of these two microphones, calculating the phase difference by way of a sensitivity adjustment means of the microphones, and detecting the direction of the subject.

In the speaker direction detection method of the prior art that is described above, there is the problem that, in a case in which the output signals of the speaker direction detection device are used to control the shooting angle of the video camera, the occurrence of errors in detection of the speaker's direction cause the video camera to be directed in a direction other than the speaker, causing great inconvenience for the users of the television conference device. Erroneous operation is particularly frequent because the results of the cross-correlation function are used without modification, and direction detection control cannot be realized without adopting some countermeasure.

In the prior art disclosed in Japanese Patent Laid-open No. 123311/1995, moreover, it is believed that erroneous detection may occur due to the influence of variations in the characteristics of the microphones when phase difference is calculated through the sensitivity adjustment means of the microphones.

SUMMARY OF THE INVENTION

It is therefore an object of the present invention to provide a speaker direction detection circuit and a speaker direction detection method that is used in the circuit that solve the above-described problems, that can reduce erroneous detection of the speaker's direction even when signals that arrive from directions other than that of the speaker combine with the speaker's speech signals, and that can increase stability.

The speaker direction detection circuit according to the present invention is provided with: an evaluation function means that uses added values of a cross-correlation function for each time difference to estimate arrival time differences that arise from differences in the distance for speech signals to reach two microphones; and a detection means that detects the maximum value of said added values of the cross-correlation function to detect the direction of a speaker.

Another speaker direction detection circuit according to the present invention is provided with: an evaluation function means that uses an evaluation function according to a relational formula between an autocorrelation function and a cross-correlation function to estimate arrival time differences that arise from differences in the distance for speech signals to reach two microphones; and a detection means that detects the maximum value of said evaluation function to detect the direction of a speaker.

The speaker direction detection method according to the present invention includes steps of: using added values for every time difference of a cross-correlation function to estimate arrival time differences that arise from differences in distance for speech signals to reach two microphones; and detecting the maximum value of said added values of the cross-correlation function to detect the direction of a speaker.

Another speaker direction detection method according to the present invention includes steps of: using an evaluation function according to a relational formula between an autocorrelation function and a cross-correlation function to estimate arrival time differences that arise from differences in distance for speech signals to reach two microphones; and detecting the maximum value of said evaluation function to detect the direction of a speaker.

The speaker direction detection circuit of the present invention is provided with a means for excluding errors by performing a time statistical process on values of the above-described cross-correlation function in the portion for estimating the arrival delay time that is present between two speech signals applied from an omnidirectional microphone (hereinbelow referred to as "a microphone").

After performing this statistical process, which is, for example, adding cross-correlation function values for a particular time interval, a search for the maximum value is executed. Carrying out the maximum value search after performing the statistical process obtains the advantage of suppressing the occurrence of search errors to a minimum.

In addition, because the values of the cross-correlation function depend on the signal power of speech that has reached the microphones, the present invention is characterized by using [the square of cross-correlation]/[the autocorrelation of time differences (delay)] in the evaluation function in searching for maximum values.

There is the further advantage that the effect of microphone sensitivity need not be considered. The evaluation function is derived from a theoretical formula that minimizes the square error of $\chi1(t)$ and $\chi2(t-\tau)$. Gain G that minimizes the square error and time difference can be found if it is assumed that the square error of $\chi1(t)$ and $\chi2(t-\tau)$ is minimized every particular frame interval (N samples).

If t is n and error is $e(n)=\chi1(n)-\chi2(n)=\chi1(n)-\chi1(n-\tau)$, square error E can be found from the following equation:

$$E = \sum e(n)^2$$
$$= \sum [\chi1(n) - G \cdot \chi1(n-\tau)]^2$$
$$= \sum [\chi1(n)]^2 - 2G \sum [\chi1(n)\chi1(n-\tau)] + G^2 \sum [\chi1(n-\tau)]^2$$

where is the sum of n=0~(N−1).

In order to find G that minimizes E, the minimum solution should be found:

$$-2G \, \Sigma[\chi1(n) \, \chi1(n-\tau)] + G^2 \Sigma[\chi1(n-\tau)^2 = 0$$

$$\therefore G = \Sigma[\chi1(n) \cdot \chi1(n-\tau)] / \Sigma[\chi1(n-\tau)]^2$$

If this is substituted into the formula for E:

$$E = \Sigma(\chi1(n))^2 - \{\Sigma[\chi1(n) \, \chi1(n-\tau)]\}^2 / \Sigma[\chi1(n-\tau)]^2$$

The square error is minimized if τ that maximizes the second term on the right side above is found. This essentially represents [square of the cross-correlation] divided by [the autocorrelation of time difference $\tau_s$].

The above objects, features, and advantages of the present invention will become apparent from the following description based on the accompanying drawings which illustrate examples of preferred embodiments of the present invention.

BRIEF DESCRIPTION OF THE DRAWINGS

FIG. 6 is a block diagram showing the configuration of a speaker direction detection circuit according to another embodiment of the present invention.

FIG. 8 shows the configuration in a case in which detection of sound is carried out by another embodiment of the present invention.

DETAILED DESCRIPTION OF THE PREFERRED EMBODIMENTS

Figure 1:
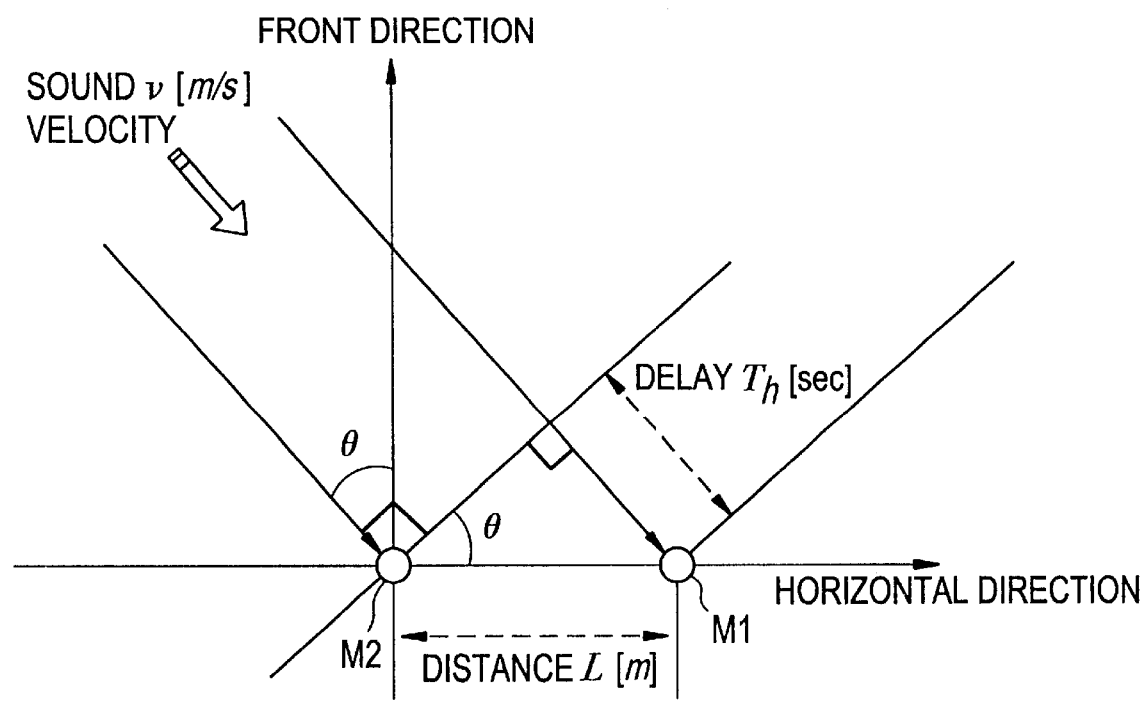
FIG. 1 shows an example of detection in a typical horizontal direction positional calculation.
Figure 2:
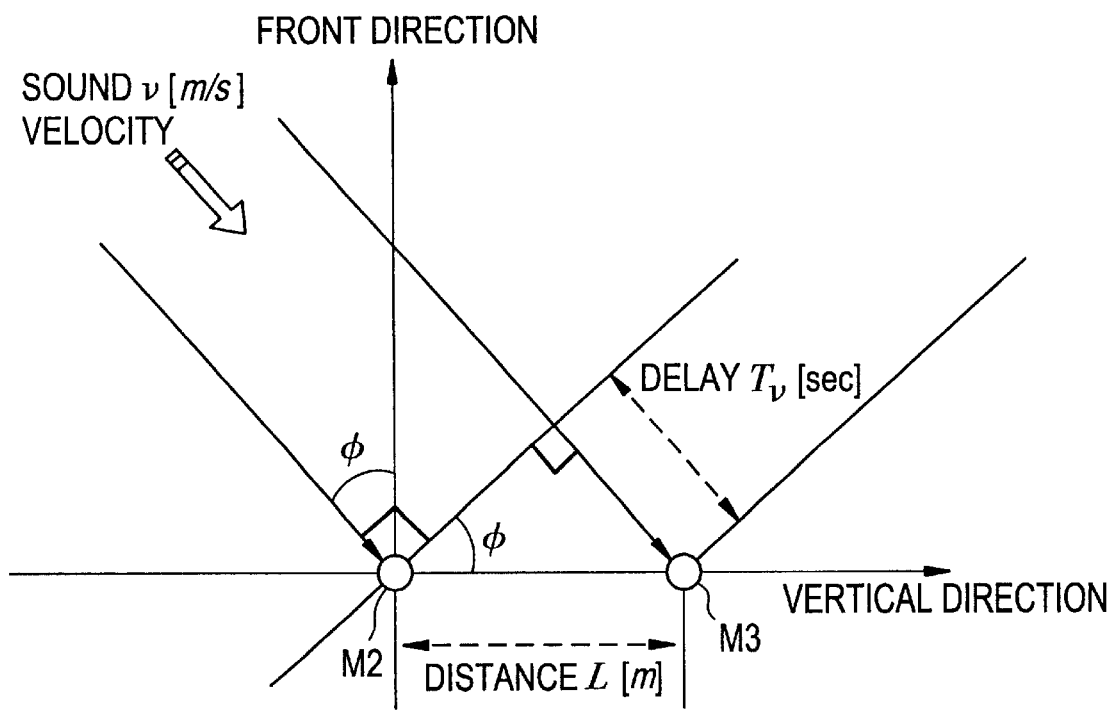
FIG. 2 shows an example of detection in a typical vertical direction positional calculation.
Figure 3:
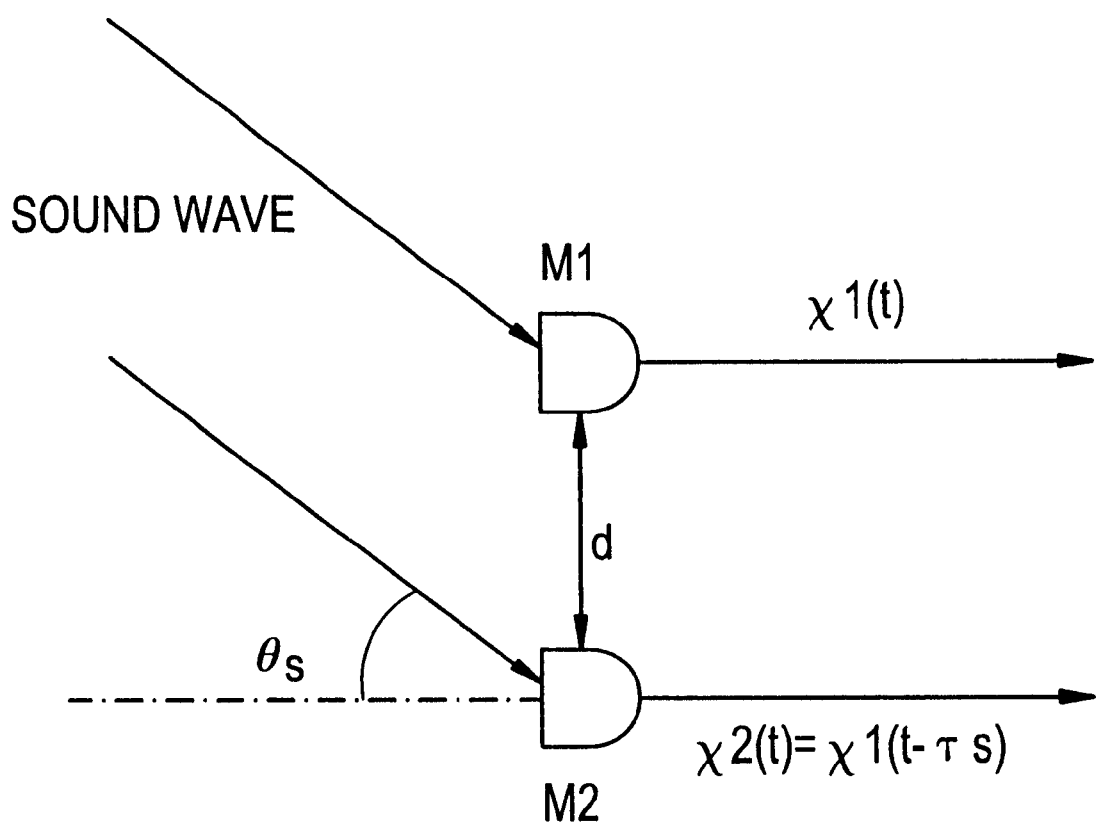
FIG. 3 shows the logic of the time difference of a signal that is received by a plurality of microphones.
Figure 4:
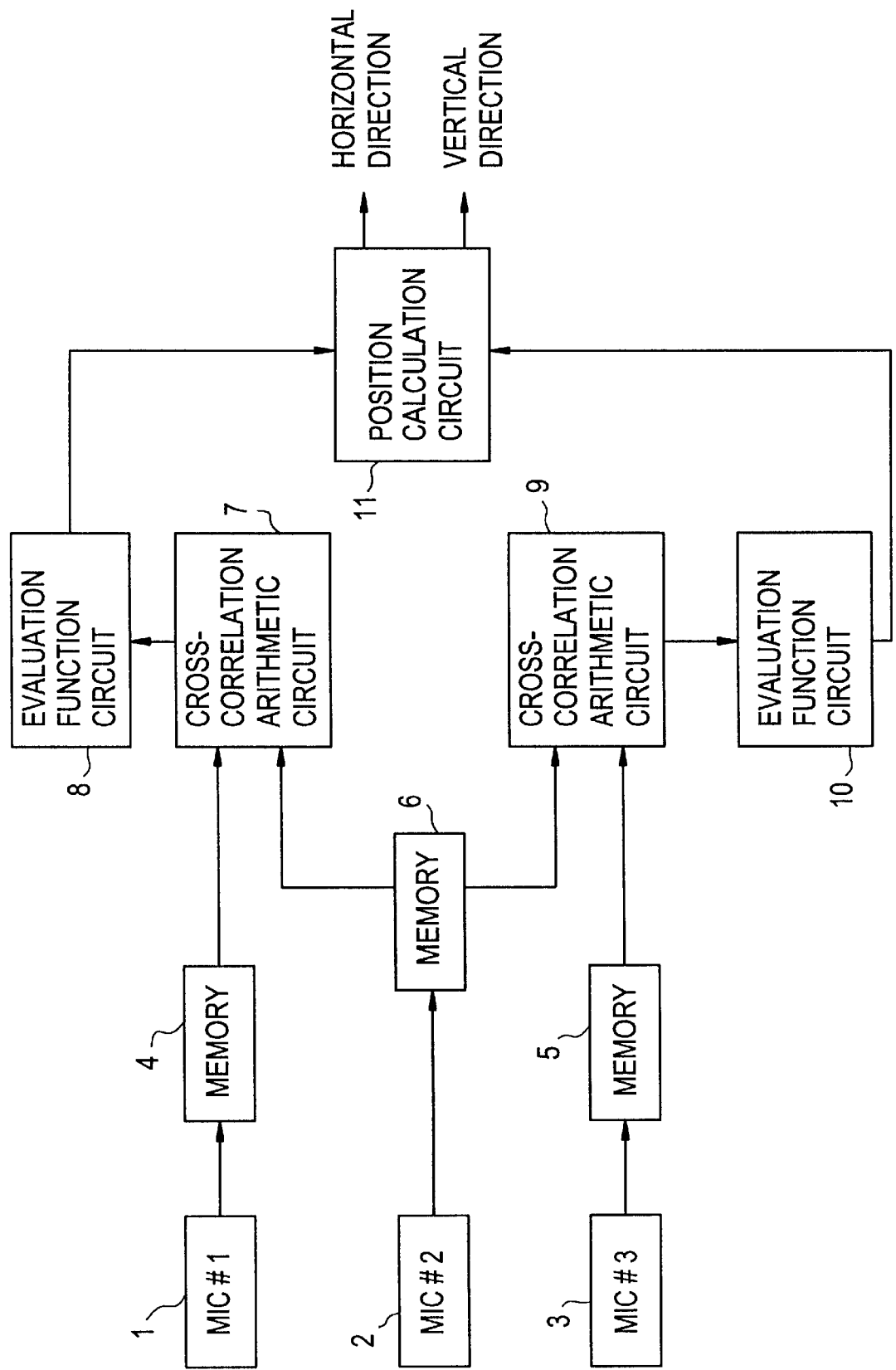
FIG. 4 is a block diagram showing the configuration of a speaker direction detection circuit according to an embodiment of the present invention.
Figure 5:
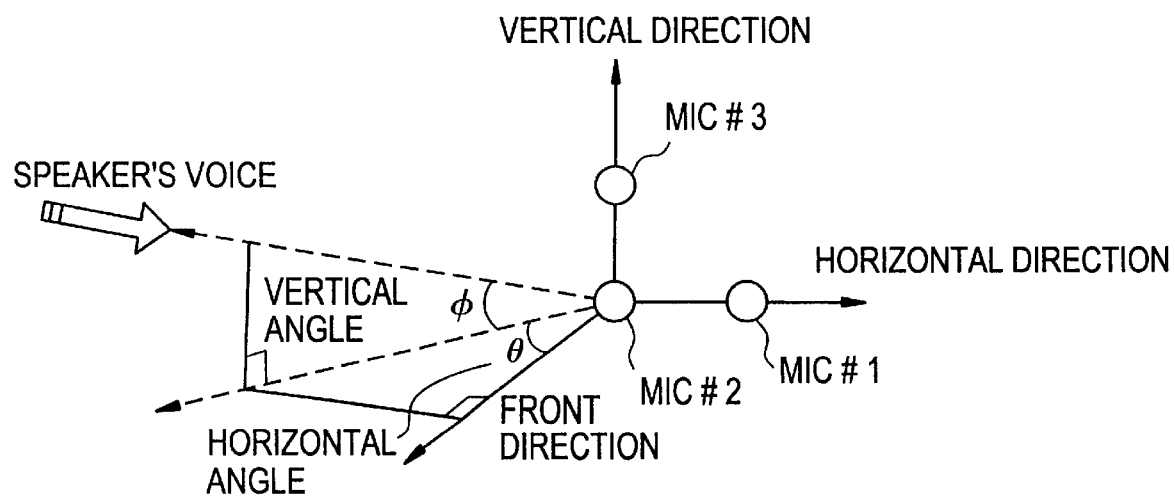
FIG. 5 shows an example of the arrangement of microphones in FIG. 4.

Referring now to the accompanying figures, a working example of the present invention is next explained. FIG. 4 is a block diagram showing the configuration of a speaker direction detection circuit according to one working example of the present invention, and FIG. 5 shows an example of the arrangement of microphones in FIG. 4. In FIG. 4, the speaker direction detection circuit according to a working example of the present invention is made up by: horizontal direction detection microphone (MIC #1) 1; horizontal-vertical direction detection microphone (MIC #2) 2; vertical direction detection microphone (MIC #3) 3; memory circuits 4 to 6; horizontal direction detection cross-correlation arithmetic circuit 7; horizontal direction detection evaluation function circuit 8; vertical direction detection cross-correlation arithmetic circuit 9; vertical direction detection evaluation function circuit 10 and position calculation circuit 11.

Signals from microphones 1 and 2 are once stored in memory circuits 4 and 6, respectively, and then supplied to cross-correlation arithmetic circuit 7. Here, microphones 1 and 2 are arranged horizontally as shown by microphones 1 and 2 in FIG. 5 and are used in searching for the horizontal direction position.

Cross-correlation arithmetic circuit 7 performs a cross-correlation operation and calculates cross-correlation function values for each time difference. Evaluation function circuit 8 carries out an adding process for particular time intervals based on the results obtained at cross-correlation arithmetic circuit 7 and then performs a search of the maximum value to calculate the time differences. Position calculation circuit 11 finds a horizontal direction angle based on these time differences (delay).

Signals from microphones 2 and 3 are once stored in memory circuits 6 and 5,-respectively, and then supplied to cross-correlation arithmetic circuit 9. Here, microphones 2 and 3 are arranged vertically as shown by microphones 2 and 3 in FIG. 5 and are used in searching for the vertical direction position.

Cross-correlation arithmetic circuit 9 performs a cross-correlation operation and calculates cross-correlation function values for each time difference. Evaluation function circuit 10 performs an adding process for particular time intervals based on the results obtained at cross-correlation arithmetic circuit 9, and then searches for the maximum value to calculate a time difference. Position calculation circuit 11 finds the vertical direction angle based on the time difference (delay).

FIG. 6 is a block diagram showing the configuration of a speaker direction detection circuit according to another working example of the present invention. In FIG. 6, the speaker direction detection circuit according to another working example of the present invention is made up by: horizontal direction detection microphone 21; horizontal-vertical direction detection microphone 22; vertical direction detection microphone 23; memory circuits 24 to 26; horizontal direction detection cross-correlation arithmetic circuit 27; horizontal direction detection autocorrelation arithmetic circuit 28; horizontal direction detection evaluation function circuit 29; vertical direction detection cross-correlation arithmetic circuit 30; vertical direction autocorrelation arithmetic circuit 31; vertical direction detection evaluation function circuit 32; and position calculation circuit 33. Apart from the addition of autocorrelation arithmetic circuits 28 and 31, the speaker direction detection circuit according to this working example of the present invention is constituted similar to the speaker direction detection circuit according to the working example of the present invention shown in FIG. 4. These autocorrelation arithmetic circuits 28 and 31 are used in calculating: [the square of the cross-correlation divided by autocorrelation] as the evaluation function at evaluation function circuits 29 and 32.

After an adding process for particular time intervals, a search for the maximum value is carried out to calculate the time difference. Based on the results of calculating the time difference (delay), a process for finding the horizontal direction angle is carried out at position calculation circuit 33.

Figure 7A:
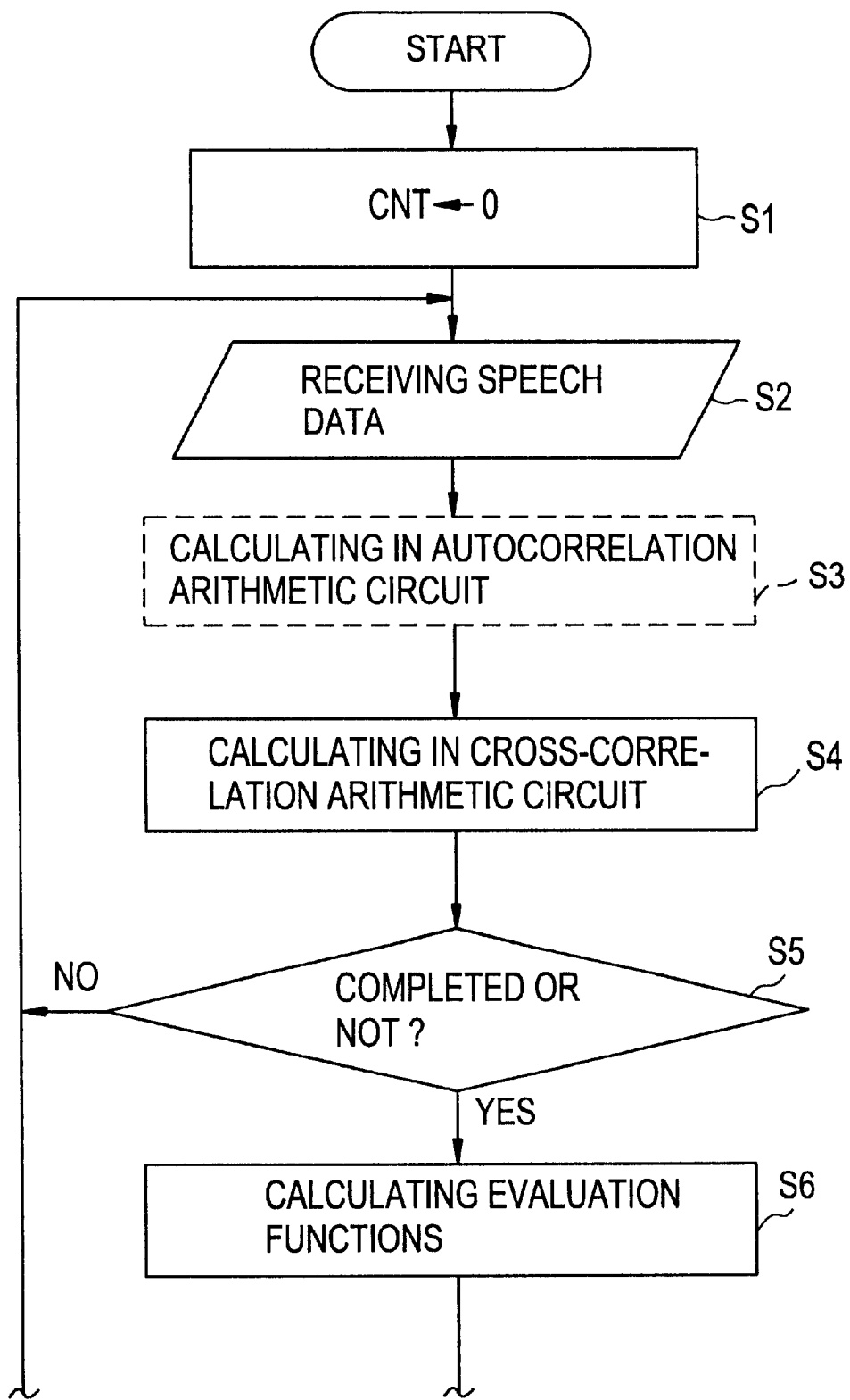
FIG. 7 is a flow chart showing the operation of a speaker direction detection circuit according to another embodiment of the present invention.
Figure 7B:
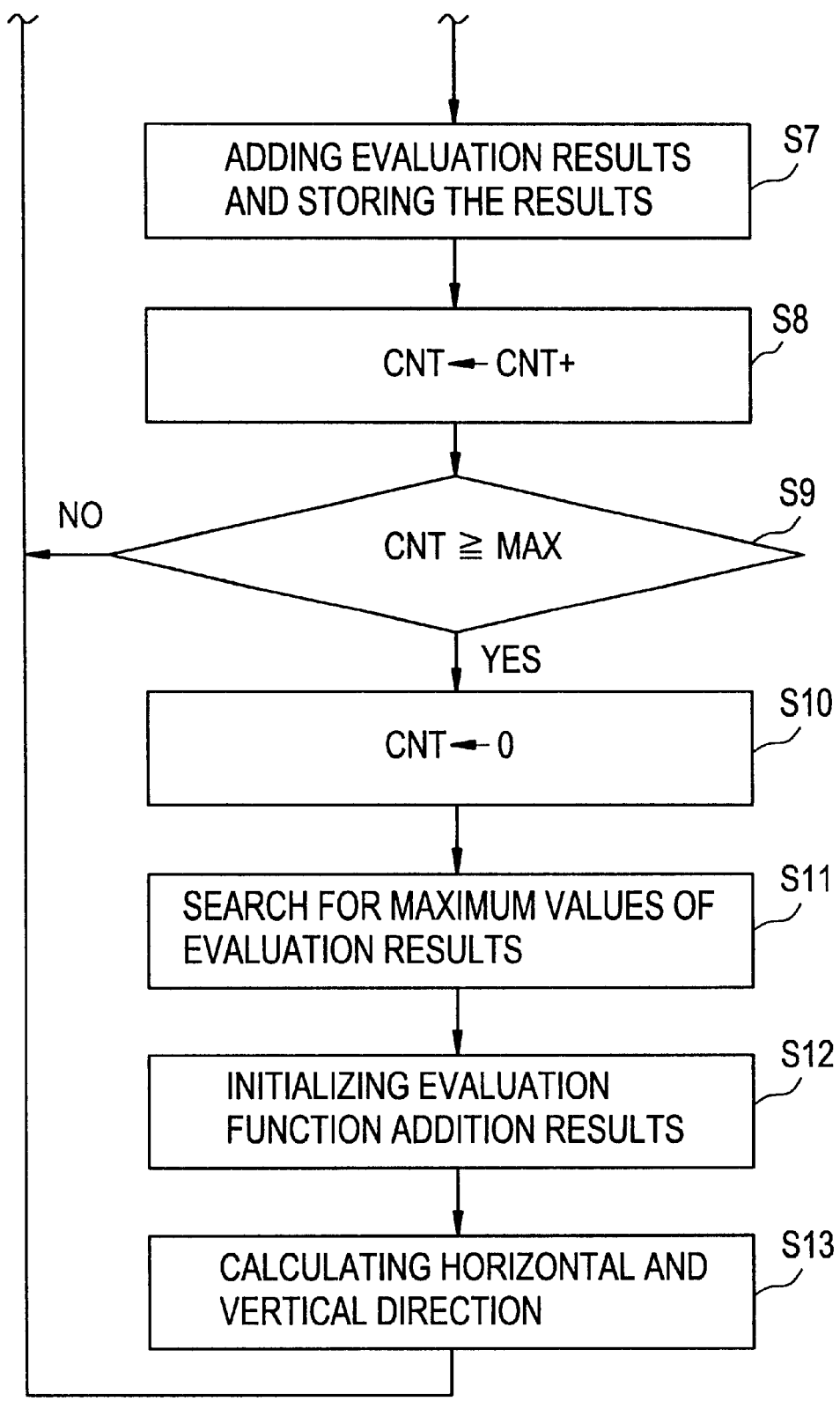

Since the calculation results of autocorrelation arithmetic circuits 28 and 31 are the same, only one of them need be calculated, and this result may be used as the input of evaluation function circuits 29 and 32. FIG. 7 is a flow chart showing the operation of the speaker direction detection circuit according to yet another working example of the present invention. Referring to FIGS. 6 and 7, the operation of the speaker direction detection circuit according to this working example of the present invention is next explained.

At the starting time of circuit operation, the value of counter (CNT) for detecting the adding time interval of evaluation results is initialized (Step S1). It is assumed that at this point in time, the evaluation function addition values are all initialized.

After speech data are received from microphones 21 to 23 (Step S2), autocorrelation functions and cross-correlation functions are calculated in autocorrelation arithmetic circuits 28 and 31 and cross-correlation arithmetic circuits 27 and 30 for approximately every 32 to 40 samples at 16 kHz sampling (Steps S3 and S4).

Calculation may be performed either by storing data of the autocorrelation functions and cross-correlation functions in buffers (not shown in the figures) and then processing all at once in frame units, or by dividing into portions by sample and calculating.

In the case of divided processing, evaluation function circuits 29 and 32 judge whether or not the correlation function operation has been completed in a correlation function operation completion determination (Step S5), and if the correlation function operation has not been completed, the process returns to Step S2 and speech data are received.

If the correlation function operation has been completed, evaluation function circuits 29 and 32 calculate evaluation functions based on results obtained by the autocorrelation calculation and cross-correlation calculation (Step S6). The evaluation functions either use "only cross-correlation" or use "the square of cross-correlation divided by autocorrelation" to calculate evaluation functions. Since the evaluation functions obtained here are subjected to statistical averaging, evaluation function circuits 29 and 32 add to past results in the addition of evaluation results and store the results (Step S7).

Since the counter value is used to measure the storage time, the counter value is updated (Step S8). Evaluation function circuits 29 and 32 compare this updated counter value with a predetermined MAX value to check the updated counter value (Step S9). The MAX value may be any value from 200 ms to 1 s.

If the counter value does not coincide with the MAX value, the process returns to step S2 and speech data are received. If the counter value coincides with the MAX value, evaluation function circuits 29 and 32 initialize the counter value to 0 (Step S10), and then search for the maximum values of the evaluation results (Step S11) and detect the time difference (delay) of the time that is the maximum.

Evaluation function circuits 29 and 32 subsequently initialize the evaluation function addition results (Step S12 in FIG. 7, and position calculation circuit 33 calculates the direction from the time difference (delay) that was detected at evaluation function circuits 29 and 32 (Step S13). This prepares for the next evaluation function addition that is to be newly begun.

The processes of Steps S2 to S13 in FIG. 7, however, must be carried out independently for each of the horizontal and vertical directions. In a case in which autocorrelation results are not used, the process of Step S3 may be omitted, and in one working example of the present invention, an operating process is carried out in which the process of Step S3 is omitted.

Although the fundamental composition of this working example of the present invention is as in the above-described example, accurate time differences are difficult to find in soundless intervals because the cross-correlation function results are used in the evaluation functions. Further measures for preventing erroneous detection are possible, such as adding a means such that results of soundless intervals are excluded and direction is detected only in intervals having sound. An example of the composition of such a circuit is next described.

FIG. 8 shows the configuration for a case of detecting intervals having sound according to another working example of the present invention. In FIG. 8, leak integration is performed by Rieke integration circuit 42 on a signal from a microphone (corresponding to microphone 2 in FIG. 4 or microphone 22 in FIG. 5) that is used in common for the cross-correlation operation of both the horizontal direction and vertical direction detection and that is obtained by way of memory 41. The result of this integration is synchronized with the timing at which the evaluation function operation is carried out and compared with a threshold value in threshold value comparison circuit 43.

Leak integration is well known in the art, and a detailed explanation of the composition and operation of leak integration circuit 42 are therefore here omitted. Leak integration may also be replaced by a sound pressure arithmetic circuit according to a square sum of the signal.

An interval is determined to be without sound if the result of the leak integration is equal to or less than the threshold value, and this determination is reported to position calculation control circuit 44. In an adding interval in which there are cases detected as soundless, position calculation circuit 45 is controlled so as not to carry out the calculation of direction and distance that is carried out upon completion of adding evaluation function values. The result that was detected in the preceding interval may be reported as the result of an interval in which direction detection is not performed, thereby obtaining the effect of preventing erroneous detection.

Figure 9:
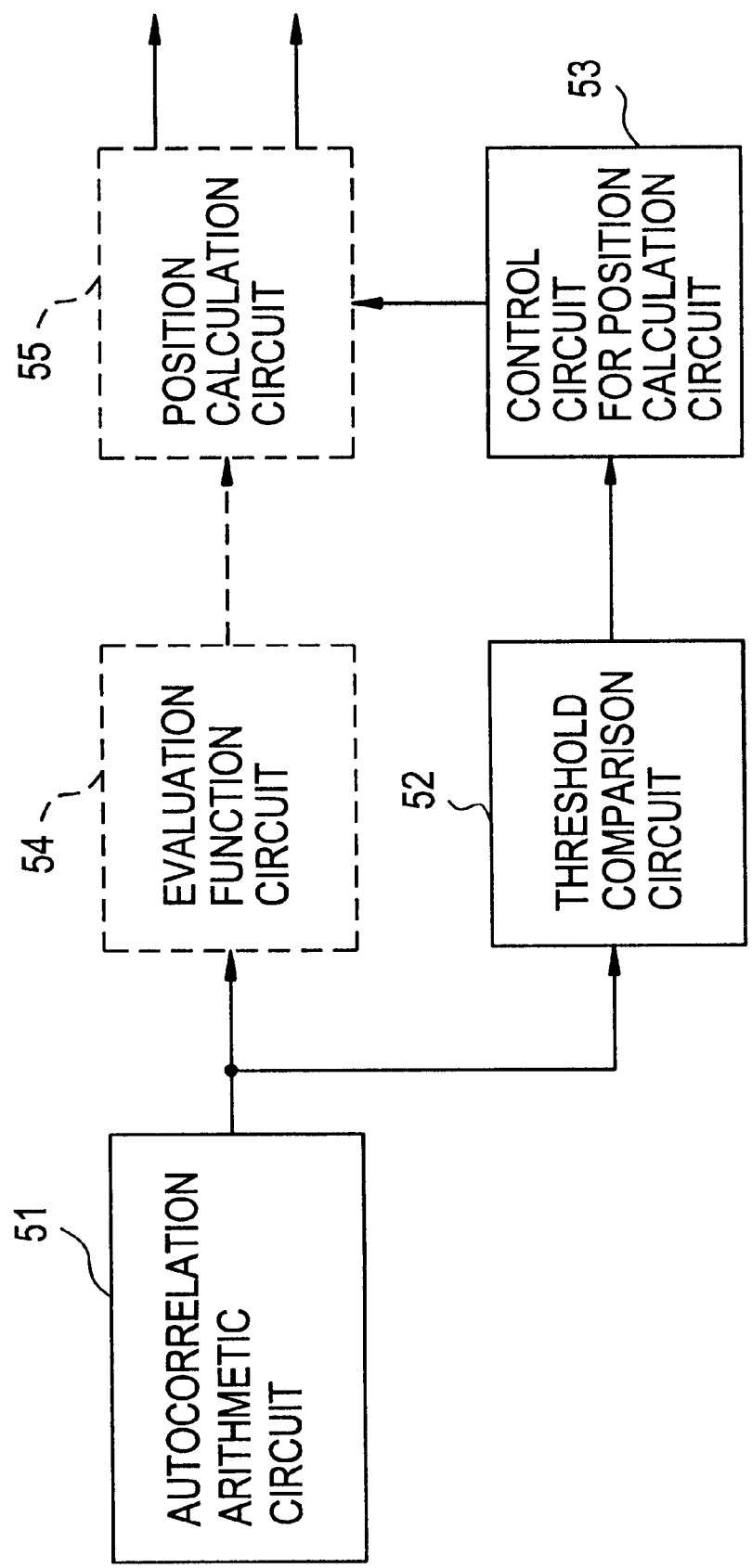
FIG. 9 shows the configuration for a case in which detection of sound is carried out using autocorrelation operation output in detection of sound according to yet another embodiment of the present invention.

FIG. 9 shows the configuration in a case of performing detection of an interval having sound using autocorrelation operation output according to yet another working example of the present invention. FIG. 9 shows a circuit in which the presence of sound is determined based on the results of the autocorrelation operation. Results of autocorrelation arithmetic circuit 51 for horizontal and vertical direction detection that are obtained by way of memory (not shown in the figure) are compared with a threshold value at threshold comparison circuit 52.

The autocorrelation operation indicates the sound pressure of an input signal, and the presence of sound can therefore be determined by comparing with a threshold value.

An interval is determined to be without sound if the autocorrelation operation value is equal to or less than the threshold value. This determination is reported to position calculation control circuit 54, and position calculation circuit 55 is controlled such that calculation of direction and distance is not carried out upon completion of adding evaluation functions that is carried out for every particular time interval. The result that was detected in the preceding interval may be reported as the result of an interval in which direction detection is not performed, thereby obtaining the effect of preventing erroneous detection.

By calculating the time differences of sound waves that reach microphones 1 to 3 and 21 to 23 in an evaluation function that uses the results of cross-correlation and auto-correlation in this way, the position of a speaker can be detected, errors in the detection of a speaker's direction can be reduced even when signals that arrive from directions other than that of the speaker combine with the speaker's speech signals, and stability can be increased. Such a case eliminates the need for sensitivity adjustment of microphones 1 to 3 and 21 to 23, which are the speech signal input means.

The present invention is not limited to the content of the above-described working examples of the present invention, and it should be clear that various working examples can be modified as appropriate within the scope of the technical idea of the present invention.

According to the present invention as described hereinabove, a speaker's direction is detected by estimating arrival time differences that arise from the difference in distance for a speech signal to reach two microphones by using added values of a cross-correlation function for each time difference and then detecting the maximum value of the added values of the cross-correlation function. The present invention has the merits of enabling a reduction of erroneous detection of the speaker's direction despite the combination of the speaker's speech signals with signals that arrive from directions other than that of the speaker, and enabling greater stability.

Although certain preferred embodiments of the present invention have been shown and described in detail, it should be understood that various changes and modifications may be made therein without departing from the scope of the appended claims.

What is claimed is:

1. A speaker direction detection circuit comprising:
   an evaluation function means that uses added values of a cross-correlation function for each time difference to estimate arrival time differences that arise from differences in the distance for speech signals to reach two microphones; and
   a detection means that detects the maximum value of said added values of the cross-correlation function to detect the direction of a speaker.

2. A speaker direction detection circuit comprising:
   an evaluation function means that uses an evaluation function according to a relational formula between an autocorrelation function and a cross-correlation function to estimate arrival time differences that arise from differences in the distance for speech signals to reach two microphones; and
   a detection means that detects the maximum value of said evaluation function to detect the direction of a speaker.

3. A speaker direction detection circuit according to claim 2 wherein said evaluation function is a value obtained by dividing the square of a cross-correlation function by an autocorrelation function; and wherein the maximum value of this evaluation function is detected and used in detecting the direction of a speaker.

4. A speaker direction detection circuit according to claim 2 wherein added values for every time difference of said evaluation function are used to estimate said arrival time differences; and the maximum value of said added values of the evaluation function is detected to detect the direction of a speaker.

5. A speaker direction detection circuit according to claim 3 wherein added values for every time difference of said evaluation function are used to estimate said arrival time differences; and the maximum value of said added values of the evaluation function is detected to detect the direction of a speaker.

6. A speaker direction detection circuit according to claim 2 wherein detection of a speaker's direction using the maximum value within an added interval is halted in a case in which an interval without sound is present during addition of said evaluation function.

7. A speaker direction detection circuit according to claim 3 wherein detection of a speaker's direction using the maximum value within an added interval is halted in a case in which an interval without sound is present during addition of said evaluation function.

8. A speaker direction detection circuit according to claim 4 wherein detection of a speaker's direction using the maximum value within an added interval is halted in a case in which an interval without sound is present during addition of said evaluation function.

9. A speaker direction detection circuit according to claim 5 wherein detection of a speaker's direction using the maximum value within an added interval is halted in a case in which an interval without sound is present during addition of said evaluation function.

10. A speaker direction detection method comprising steps of:
    using added values for every time difference of a cross-correlation function to estimate arrival time differences that arise from differences in distance for speech signals to reach two microphones; and
    detecting the maximum value of said added values of the cross-correlation function to detect the direction of a speaker.

11. A speaker direction detection method comprising steps of:
    using an evaluation function according to a relational formula between an autocorrelation function and a cross-correlation function to estimate arrival time differences that arise from differences in distance for speech signals to reach two microphones; and
    detecting the maximum value of said evaluation function to detect the direction of a speaker.

12. A speaker direction detection method according to claim 11 wherein said evaluation function is a value obtained by dividing the square of a cross-correlation function by an autocorrelation function; and the maximum value of this evaluation function is detected and used in detecting the direction of a speaker.

13. A speaker direction detection method according to claim 11 wherein added values for each time difference of said evaluation function are used to estimate said arrival time differences; and the maximum value of said added values of the evaluation function is detected to detect the direction of a speaker.

14. A speaker direction detection method according to claim 12 wherein added values for each time difference of said evaluation function are used to estimate said arrival time differences; and the maximum value of said added values of the evaluation function is detected to detect the direction of a speaker.

15. A speaker direction detection method according to claim 11 wherein detection of a speaker's direction using the maximum value within an added interval is halted in a case in which an interval without sound is present during addition of said evaluation function.

16. A speaker direction detection method according to claim 12 wherein detection of a speaker's direction using the maximum value within an added interval is halted in a case in which an interval without sound is present during addition of said evaluation function.

17. A speaker direction detection method according to claim 13 wherein detection of a speaker's direction using the maximum value within an added interval is halted in a case in which an interval without sound is present during addition of said evaluation function.

* * * * *